F. P. SARGENT.
AEROPLANE SAFETY DEVICE.
APPLICATION FILED FEB. 12, 1919.
1,314,220.
Patented Aug. 26, 1919.
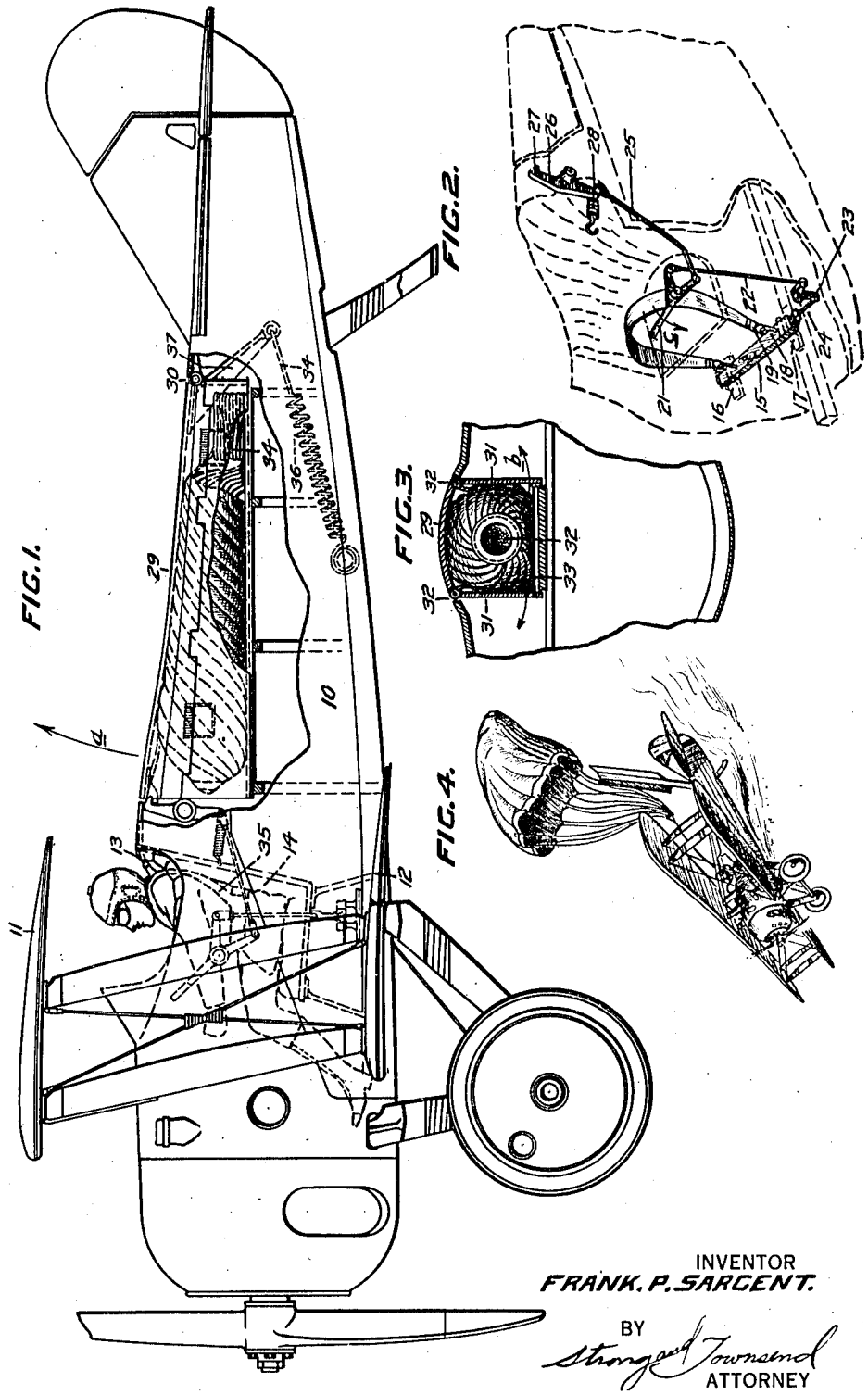
INVENTOR
FRANK. P. SARGENT.
BY
ATTORNEY

UNITED STATES PATENT OFFICE.

FRANK P. SARGENT, OF SAN FRANCISCO, CALIFORNIA.

AEROPLANE SAFETY DEVICE.

1,314,220.  Specification of Letters Patent.  Patented Aug. 26, 1919.

Application filed February 12, 1919.  Serial No. 276,526.

*To all whom it may concern:*

Be it known that I, FRANK P. SARGENT, a citizen of the United States, residing at San Francisco, in the county of San Francisco and State of California, have invented new and useful Improvements in Aeroplane Safety Devices, of which the following is a specification.

This invention relates to an aeroplane, and particularly pertains to a safety device therefor.

It is the principal object of this invention to provide a simple and positively acting safety device which may be embodied within the construction of an aeroplane, and which may be easily operated to release and project a parachute into the air and at the same time to release the operator to allow him to be drawn from the aeroplane as it falls.

A device of this character has been disclosed in my co-pending application entitled "Safety device for aeroplanes", filed September 24th, 1918, and bearing the Serial Number 255,435. However, in the present instance improvements have been made in the construction of the parachute carrier and means whereby it may be released and unfolded.

The invention resides in a parachute container, preferably mounted within the fuselage of the machine and adapted to swing rearwardly and upwardly therefrom to disclose a parachute carried thereby; the container being further constructed to swing away from the parachute and allow it to be carried into the air by the force of the air currents, and simultaneously with this movement means being actuated whereby the occupant of the aeroplane may be released automatically.

The invention is illustrated by way of example in the accompanying drawings, in which—

Figure 1 is a view in side elevation, illustrating an aeroplane with parts broken away to more clearly show the parachute carrier mounted within the fuselage.

Fig. 2 is a fragmentary view in perspective, illustrating the means whereby the operator is held in his seat and the mechanism whereby the holding means and the parachute carrier may be simultaneously released.

Fig. 3 is a fragmentary view in end elevation, showing the construction of the carrier and the manner in which a parachute is packed therein.

Fig. 4 is a perspective view, illustrating the operation of the invention.

Referring more particularly to the drawings, 10 indicates the fuselage of an aeroplane, which may be of any desired design and is here shown as carrying planes 11 and 12. In the forward end of the fuselage is formed a cock-pit 13, within which is positioned a seat 14.

As shown in Fig. 2, a lock bar 15 is disposed beneath this seat and is slidable laterally of the aeroplane body within brackets 16 and 17, fixed to the floor thereof. The bar 15 is fitted with a pair of hooks 18 having horizontally turned portions adapted to engage the rings 19 of a safety strap 20. This strap is intended to pass across the knees of the operator and hold him within the machine irrespective of the flying position. The strap 20 may be released by the manipulation of a lever 21 which is pivoted upon the inside wall of the cock-pit and is provided with an operating rod 22 extending downwardly and indirectly actuating the lock bar 15 by means of a bell-crank 23 and a rod 24.

The lever 21 has an operating rod 25 attached thereto, which rod extends rearwardly and engages a catch lever 26. The catch lever 26 is formed with a lock finger 27, at its upper end, and is further provided with a tension spring 28, by which the lock finger may be normally held in engagement with a lip formed as a part of a parachute projecting arm 29. This arm is of the contour of the top wall of the fuselage and extends from a point directly in the rear of the cock-pit to a point directly in front of the empennage. At this point the arm 29 is pivoted to the fuselage by a hinge 30 which will allow the arm to swing upwardly and rearwardly in the direction of the arrow *a* as indicated in Fig. 1, when the lock member 26 is released.

Secured to the opposite longitudinal edges of the arm 29 are side panels 30 and 31. These panels are connected to the arm by means of hinges 32. It is preferable that coil springs be embodied as a part of these hinges, so that the panels will swing outwardly in the direction of arrow *b*, as indicated in Fig. 3, when the structure is free of the fuselage. The arm 29 and the two side panels form a compartment within which a parachute 32 is mounted. The parachute is held in position by springs 33 which temporarily hold the panels 30 and 31 in parallel relation with each other, as indicated in Fig. 3.

Within the parachute compartment and at the lower end thereof a cable 34 is coiled. This cable is connected to the parachute at one end and fastens to a shoulder strap 35 at its opposite end. The shoulder strap is worn by the operator at all times and thus it will be seen that he will be properly secured to the parachute and may be withdrawn thereby in case of accident.

In the operation of the present invention, the occupant of the aeroplane is strapped into the cock-pit by means of the belt 20 and the shoulder straps 35 are properly connected with the cable 34. In the event that the aeroplane meets with an accident, the lever 21 is swung downwardly in the direction of arrow *c*, as indicated in Fig. 2, and this will shift the bar 15 to release the strap 20 and at the same time will swing the finger 27 of the lock member 26 out of engagement with the projecting arm 29.

The projecting arm 29 will instantly swing upwardly and rearwardly toward the empennage. This action will be due to the fact that a tension spring 36 is provided and connected with a throwing arm 37. The arm 37 stands downwardly and rearwardly from its point of connection with the projecting arm 29 and the spring connects by one end to this arm while its opposite end is secured to a suitable frame member within the fuselage. Thus, the projecting arm will move from its concealed position within the fuselage and as it moves outwardly, it will reach a point when the panels 31 are clear of the sides of the fuselage. When this point has been reached, the tension of the springs on the hinges 32, coupled with the wind pressure, will break the strings 33 and allow the two panels 31 to swing outwardly and rearwardly. This will completely disclose the parachute and will allow it to be struck by the full force of the wind pressure. This action will cause the parachute to open and as the machine falls, will uncoil the cable 34 and thereafter draw the operator from the cock-pit, it being understood that he had been released by the operation of the lock bar 15, as previously explained.

It will thus be seen that by use of the structure here disclosed, the parachute will be thrown clear of the machine and will be instantly exposed to the wind so that it may open without requiring the use of mechanical projecting means and without possibility of it becoming tangled or folded in a manner to prevent opening.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is:—

1. A safety device for aeroplanes, comprising a parachute mounted on the body of the plane with its top foremost to drive it, a container for said parachute fixed to the aeroplane and having distensible walls, pivoting means whereby said container may be swung outwardly from the machine, means for distending the walls of said container when the same reaches its outward position, whereby the parachute will be exposed in an unrestricted condition to allow it to be opened by the wind pressure.

2. A safety device for aeroplanes, comprising a swinging projecting arm mounted upon the fuselage of an aeroplane, panels carried by said arm for forming a parachute compartment, a parachute mounted within the compartment thus formed, and means whereby the panels will swing away from the sides of the parachute when the projecting arm swings outwardly from the fuselage, thus exposing the parachute to the full action of the wind.

3. A safety device for aeroplanes, comprising a parachute, a projecting arm hinged to the fuselage of the aeroplane and acting to form a portion of the top wall thereof, hinged side panels mounted along the opposite sides of said arm and providing a trough-shaped compartment for the parachute, means for normally holding the compartment and the parachute within the fuselage, and operating means by which the projecting arm may be forcibly swung outwardly and rearwardly to lift the panels and the parachute from within the fuselage and to permit the panels to swing outwardly to release the parachute.

4. A safety device for aeroplanes comprising a parachute, a parachute carrier fixed to the aeroplane and normally disposed longitudinally within the fuselage of the aeroplane with its head formost and adapted to swing therefrom, means for normally holding the carrier in its inoperative position, a safety device for holding the operator within his seat, and releasing means for simultaneously releasing the operator and the holding means of the parachute carrier.

In testimony whereof I have hereunto set my hand in the presence of two subscribing witnesses.

FRANK P. SARGENT.

Witnesses:
W. W. HEALEY,
M. E. EWING.